July 14, 1953 H. V. GRIFFITTS 2,645,432
DETACHABLE SPRING CONNECTING MEANS FOR SPRING DRIVEN REELS
Filed May 9, 1949
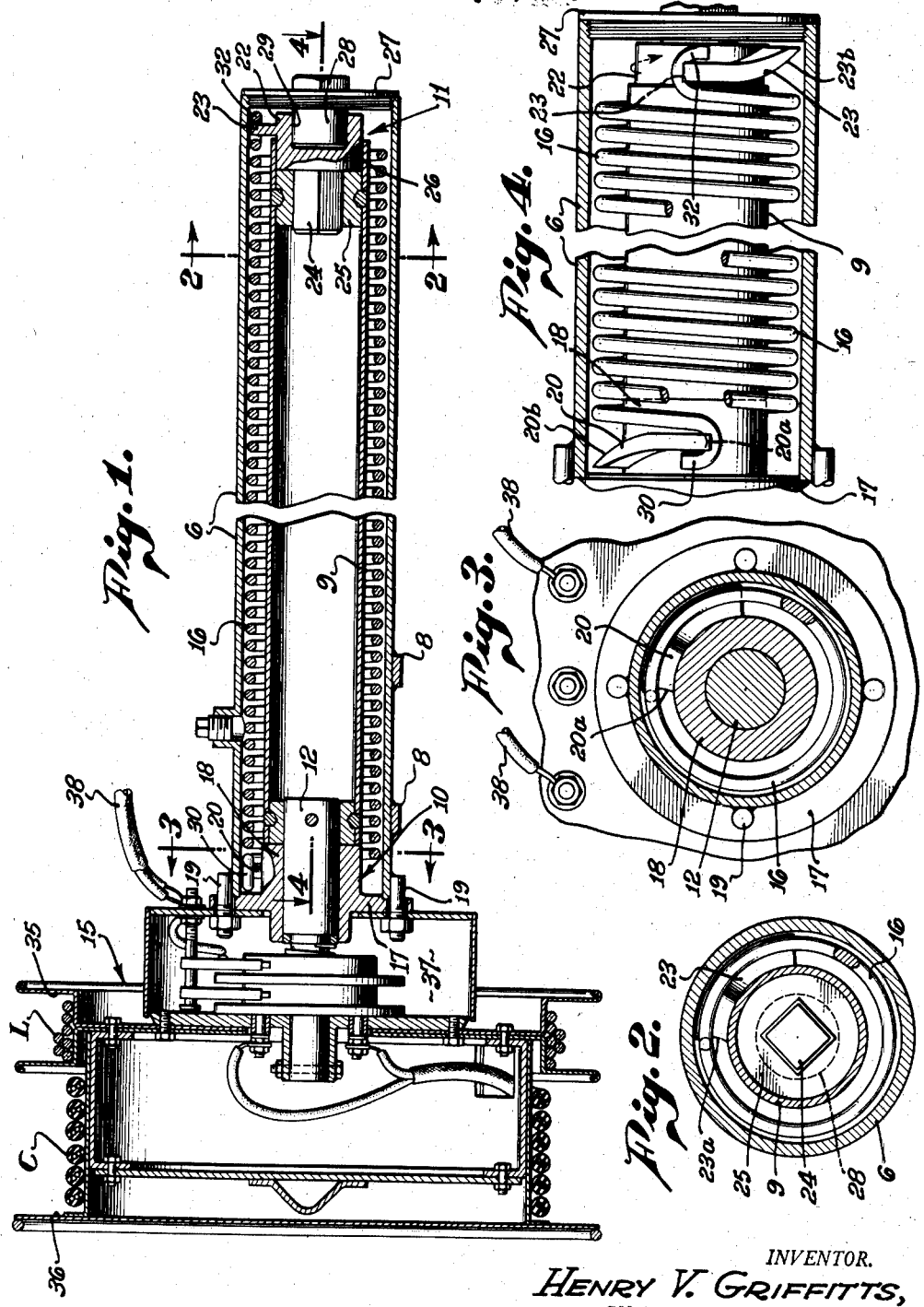
INVENTOR.
*Henry V. Griffitts,*
BY
*Paul A. Weilein*
ATTORNEY.

Patented July 14, 1953

2,645,432

UNITED STATES PATENT OFFICE 2,645,432

DETACHABLE SPRING CONNECTING MEANS FOR SPRING DRIVEN REELS

Henry V. Griffitts, Los Angeles, Calif., assignor to McCaffrey-Ruddock Tagline Corporation, Los Angeles, Calif., a corporation of California Application May 9, 1949, Serial No. 92,222

4 Claims. (Cl. 242—107)

This invention relates to spring driven reels for maintaining a line, cable or the like under substantially constant tension and free of slack as the effective length of the line varies; more particularly, it relates to connecting means for the driving springs of such reels.

It is an object of this invention to provide an improved reel of this type.

Spring driven reels or the like of the type under discussion are extensively used in connection with various types of material handling equipment, cranes, hoists and the like, forming an integral part of a plant so that costly shutdowns thereof will result if the material handling equipment is rendered inoperative by failure of the reel. It is thus of considerable importance that the reel not only be of rugged design but additionally be readily repaired. Since the driving spring is a common source of failure, it is particularly advantageous that the reel be arranged to permit replacement thereof in a simple manner.

It is accordingly another object of this invention to provide a spring driven reel so arranged that the replacement of the spring is a simple matter, and may be accomplished without dismantling the structure.

In U. S. Patent No. 2,303,002 granted to William Ruddock on November 14, 1942, and entitled "Tagline Device," a spring driven reel is shown, wherein a winding drum is secured on one end of an elongated member rotatably supported in a stationarily mounted housing, a helical driving spring being confined in the annular space therebetween and connected at its opposite ends respectively to the member and the housing. It is another object of this invention to provide novel connection forming means for the spring in such a device.

In said patented device, the rotatable member extends the length of the housing and is supported by bearing structures at opposite ends thereof. It is another object of this invention to provide a novel bearing structure which will facilitate installation and removal of the spring.

This invention possesses many other advantages and has other objects which may be made more easily apparent from a consideration of one embodiment of the invention. For this purpose there is shown a form in the drawings accompanying and forming part of the present specification. This form will now be described in detail, illustrating the general principles of the invention; but it is to be understood that this detailed description is not to be taken in a limiting sense, since the scope of the invention is best defined by the appended claims.

In the accompanying drawings:

Figure 1 is a longitudinal axial section partly in elevation, showing a spring driven reel incorporating the features of the invention;

Figures 2 and 3 are transverse sections on an enlarged scale, taken substantially as indicated by the correspondingly numbered lines on Figure 1; and Figure 4 is a fragmentary sectional view on an enlarged scale, taken substantially as indicated by line 4—4 of Figure 1, and showing in elevation the driving spring and its method of anchoring.

Referring to the drawing, the device includes an elongated tubular support member or housing 6 adapted to be mounted as by the aid of mounting pads 8 secured to a derrick boom, crane frame or other suitable structure (not shown). A hollow cylindrical member 9 extending axially of the housing 6 is rotatably supported by the aid of bearing structures 10 and 11 secured in the housing 6 respectively adjacent the opposite ends thereof.

The rotatable member 9 has a reduced portion 12 at one end formed by a short shaft or pintle which forms one element of the bearing structure 10 and projects from the housing 6, carrying the winding drum structure 15 on which the tensioned line L is wound. For urging the drum 15 to rotate in line winding direction with respect to the housing or support 6 a helical spring 16 is provided in the space between the housing 6 and the rotatable member 9, the opposite ends of the spring 16 being detachably connected respectively to the support 6 and to the rotatable member 9.

For this purpose a closure head 17 having a hub 18 is secured to that end of the housing 6 adjacent the winding drum 15 as by the aid of bolts 19. The hub 18 has a through bore rotatably supporting the pintle 12 and cooperating therewith to form the bearing structure 10 supporting one end of the cylindrical member 9. The head 17 also has a lug or projection 20 for engaging the end of the spring 16 and detachably connecting it to the support 6, to be described more fully hereinafter.

The bearing structure 11 supporting the other end of the cylindrical member 8 comprises a bearing element 22 which has a similar lug 23 for engaging the opposite end of the spring 16, also to be described more fully hereinafter. The bearing element 22 is adapted to be in telescopic driving relation with the member 9 by the aid of a splined portion 24 which may conveniently be of square cross section, and engages a correspondingly shaped through opening in a bushing 25 secured with the member 9 which may be of tubular form. For accurately and firmly supporting the member 9, the bearing element 22 has a cylindrical portion 26 telescopically engaging the end of said member.

A threaded closure member 27 is provided for the end of the housing 6 opposite the drum 15, and has an inwardly extending stub shaft or pintle 28 which rotatably supports the bearing element 22 by engaging a circular recess 29 therein.

It will be readily apparent from an inspection of Figures 1 and 2 that the spring connecting lug 23 extends substantially entirely across a portion of the annular space between the housing 6 and the rotatable member 9. Thus, merely removing the closure 27 will not enable placement or removal of the spring 16. However, the telescopic fit of the bearing member 22 with the member 9 is such that the member 22 which carries the lug 23 may be readily removed after removal of the closure 27, leaving the annular space unobstructed.

The arrangement is such that any tendency of the line L to become slack as by movement of the object to which it is attached toward the reel is immediately counteracted by rotation of the winding drum 15 resulting from the force exerted by the spring 16. On the other hand, increased tension in the line as by movement of the object away from the reel will cause the drum 15 to rotate in line unwinding direction against the force of the spring 16. Thus, the tension in the line L is at all times determined by the force of spring 16.

However, as pointed out in the previously identified patent, it is desirable to protect the spring 16 against excessive unwinding movement, such as would result from spinning of the reel caused by its inertia, upon breakage or disconnection of the line L. Accordingly, the means connecting the ends of the spring 16 to the support 6 and to the drum carrying rotatable member 9 are arranged to have a ratchet-like action, disconnecting the spring upon continued rotation of the drum in spring unwinding direction after the spring has reached a condition of zero torque, and immediately reconnecting the spring upon reverse rotation of the drum.

Thus, as shown in Figure 4, the opposite ends of the spring 16 are formed as oppositely facing hooks 30 and 32 adapted to engage respectively the faces 20–a and 23–a of the driving lugs or projections 20 and 23, these faces being preferably rounded to retain the hooks in place, the opposite end portions 20–b, 23–b sloping toward the adjacent ends of the housing 6. It can be readily seen that rotation of the member 9 in the direction of the arrow in Figure 4 will cause the hooks 30 and 32 to engage the ends 20–a and 23–a of the lugs and that rotation in the opposite direction will cause disengagement of the hooks which will ride past the projections on the slanting surfaces 20–b, 23–b respectively. The spring 16 is of such free length that upon insertion in the housing 6 and with both closures 17 and 27 in place, the spring is under some compression to insure that the hooks 30 and 32 will engage the corresponding lugs 20 and 23 upon movement of the drum 15 and member 9 in line unwinding direction against the tension of the spring 16.

Should it be desired to remove the spring 16, the reel is manipulated to release the tension in the spring and to disconnect it from the support lug 20. The closure 27 is then removed, after which the bearing element 22 is removed so that the lug 23 no longer obstructs the annular space between the housing 6 and the rotatable member 9, allowing ready removal of the spring 16 in one piece if unbroken, or of the pieces thereof if broken. A new spring may then be inserted, and the bearing element 22 and the closure 27 replaced. Appropriate rotation of the drum 15 will cause the ends of the springs 16 to connect with the lugs 20 and 23 as previously discussed.

With the described arrangement, the spring 16 may be replaced as required, by breakage or otherwise, without disturbing the winding drum 15, which is shown by way of example as dual, having one section 35 accommodating the tagline L and another section 36 accommodating an electrical conducting cable C for supplying power to a lifting magnet, as discussed in the previously identified patent. A slip ring structure 37 is provided for connecting the cable C with the power leads 38, and it will be obvious that dismantling all of the foregoing as would be the case if the closure 17 was required to be removed to allow replacement of the spring 16, would entail a substantial amount of labor.

I claim:

1. In a spring driven reel device: a support including an elongated tubular member and an inner member extending axially within said tubular member; a winding drum rotatably mounted on said support; a coiled spring; means detachably coupling one end of said spring to said support; means coupling the other end of said spring to said drum including a member secured in driving relation with said drum for detachment from said other end of said spring in a direction outwardly from the other end of said spring and detachable retaining means for said member mounted on said support for detachment therefrom to permit removal of said spring in said outward direction.

2. In a spring driven reel device: a support including an elongated tubular member; means extending axially in said member, rotatably supported thereby and cooperating therewith to form an annular space; a coil spring in said space and detachably coupled at one end to said support; driving means, including a lug adapted to extend across said space adjacent one end of said support to which the other end of said spring is coupled, and axially movable through said end of said support into and out of driving relation with said rotatable means, said lug, when said driving means is out of driving relation with said rotatable means, being clear of said space to permit placement and removal of said spring, and means mounted on said tubular member for removal outwardly from said tubular member to afford access to and axial movement of said lug out of driving relation with said rotatable means.

3. In a spring driven reel device: a support including an elongated tubular member; a member extending axially within said tubular member, and having a portion projecting from one end thereof mounting a winding drum; bearing means respectively adjacent the ends of said tubular member rotatably supporting said axially extending member, the bearing means adjacent the end of said tubular member remote from said one end comprising a driving member splined to said axially extending member and having a bearing surface, and a supporting member having a cooperating bearing surface and detachably secured to said tubular member; and a coil spring detachably secured at its opposite ends respectively to said support and to said axially extending member.

4. In a spring driven reel device: a support including an elongated tubular member; a member extending axially within said tubular member; bearing means respectively adjacent the ends of said tubular member rotatably supporting said axially extending member; said axially extending member having a portion projecting through one of said bearing means and mounting a winding drum; the other bearing means comprising a closure element mounted on the end of said tubular member so as to be removable outwardly from said tubular member, a driving element, means mounted in coaxial relation with said axially extending member, mounting a portion of said driving element in telescopic and splined driving relation with said axially extending member, one of said elements having a pintle rotatably engaging a recess in the other element; and a coiled spring connected respectively at its opposite ends to said support and to said driving element.

HENRY V. GRIFFITTS.

References Cited in the file of this patent

UNITED STATES PATENTS

| Number | Name | Date |
|---|---|---|
| 2,303,002 | Ruddock | Nov. 24, 1942 |
| 2,367,912 | Westfall | Jan. 23, 1945 |